Feb. 17, 1931.　　　A. P. WISNER　　　1,793,270
BRAKE
Filed April 22, 1929　　　2 Sheets-Sheet 2

INVENTOR.
Andrew P. Wisner
BY P. M. Pomeroy
ATTORNEY

Patented Feb. 17, 1931

1,793,270

UNITED STATES PATENT OFFICE

ANDREW P. WISNER, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed April 22, 1929. Serial No. 357,060.

This invention relates to vehicle brakes and particularly to means for actuating the brake operating mechanism, the principal object being to provide a new and novel means for actuating the brake mechanism, which means is simple in construction and economical to manufacture.

Another object is to provide a brake operating mechanism with an actuating member which swings about a pivot having its axis substantially parallel with the longitudinal axis of the vehicle axle.

Another object is to provide a brake operating mechanism with an actuating member which is pivotally supported intermediate its ends the pivot being offset from the longitudinal axis of the member whereby the unsupported end thereof sweeps through a circular path to actuate the brake operating mechanism.

A further object is to provide a vehicle brake having a pivoted operating arm provided with a flat finger at one end thereof operated by the free end of an actuating member hingedly supported intermediate its ends whereby the free end of said member sweeps through a circular path to move the pivoted operating arm.

These being among the objects of the present invention the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a transverse section taken through the left front wheel brake of a motor vehicle, showing the actuating means for the brake mechanism mounted upon the vehicle axle.

The brake chosen for illustration forms no part of my invention except in so far as the actuating means therefor is applied to the said brake actuating mechanism and, therefore, a detailed description of the brake per se is believed to be unnecessary and it will, therefore, only be generally described herein. The brake operates in a manner similar to the construction shown in an application of Robert F. Kohr, Serial No. 334,733, filed January 24, 1929, minor details of construction, however, being slightly different from those shown in the Kohr application above referred to.

Figure 1:
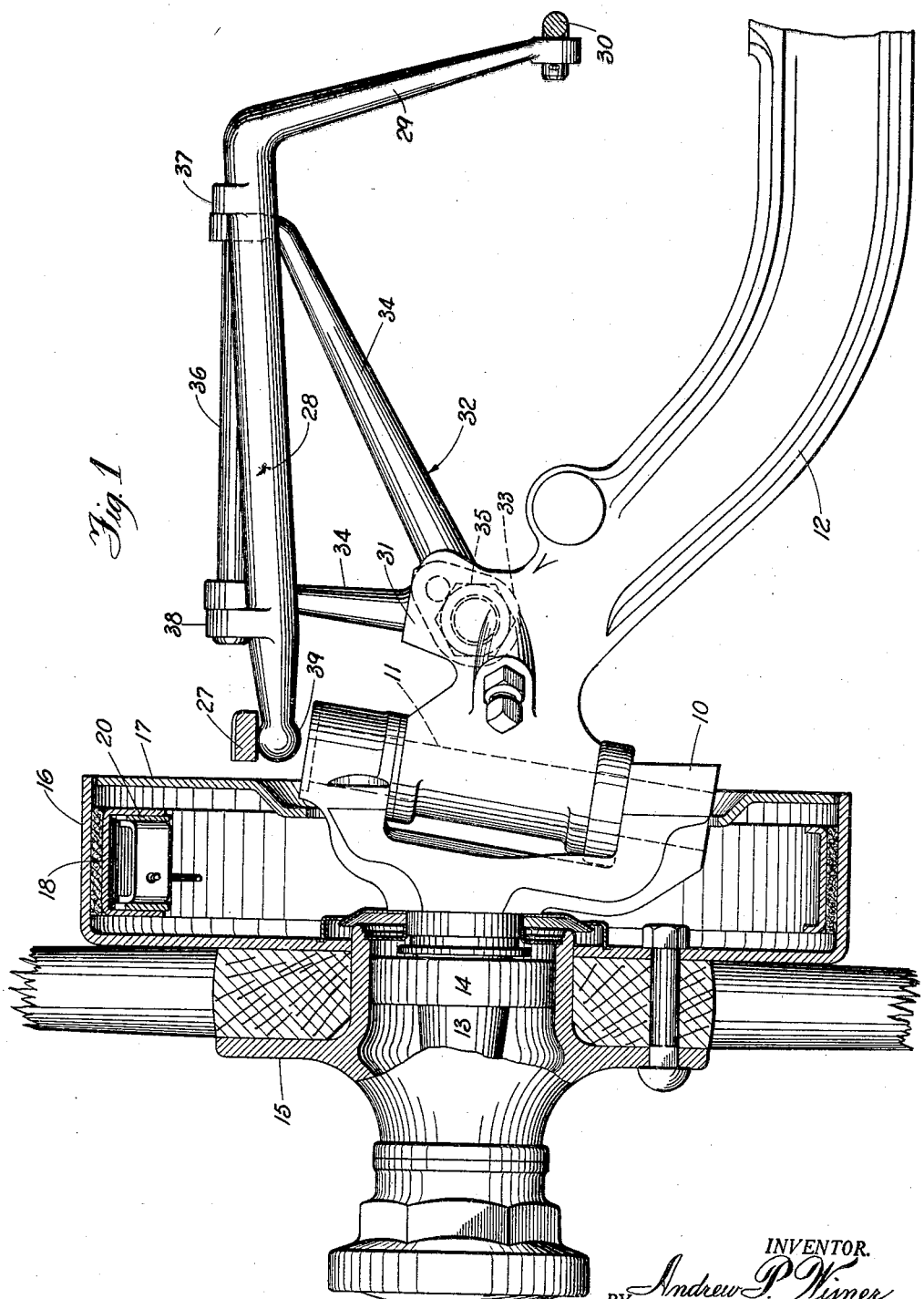

Referring to the accompanying drawings in which like numerals refer to like parts through the several views, a steering knuckle 10 is pivoted by means of a king pin 11 (shown in broken outline in Figure 1) to the end of the front axle 12. The steering knuckle 10 is formed with the conventional outwardly extending stub axle 13 which carries the bearings 14 supporting the vehicle wheel 15 on the stub axle 13. The brake drum 16 is secured to the vehicle wheel 15 in concentric relation therewith and has a dust cover or backing plate 17 adjacent to the open end of the same. The backing plate 17 is rigidly secured to the steering knuckle 10 by any suitable means in order to provide the support for the brake mechanism.

Figure 2:
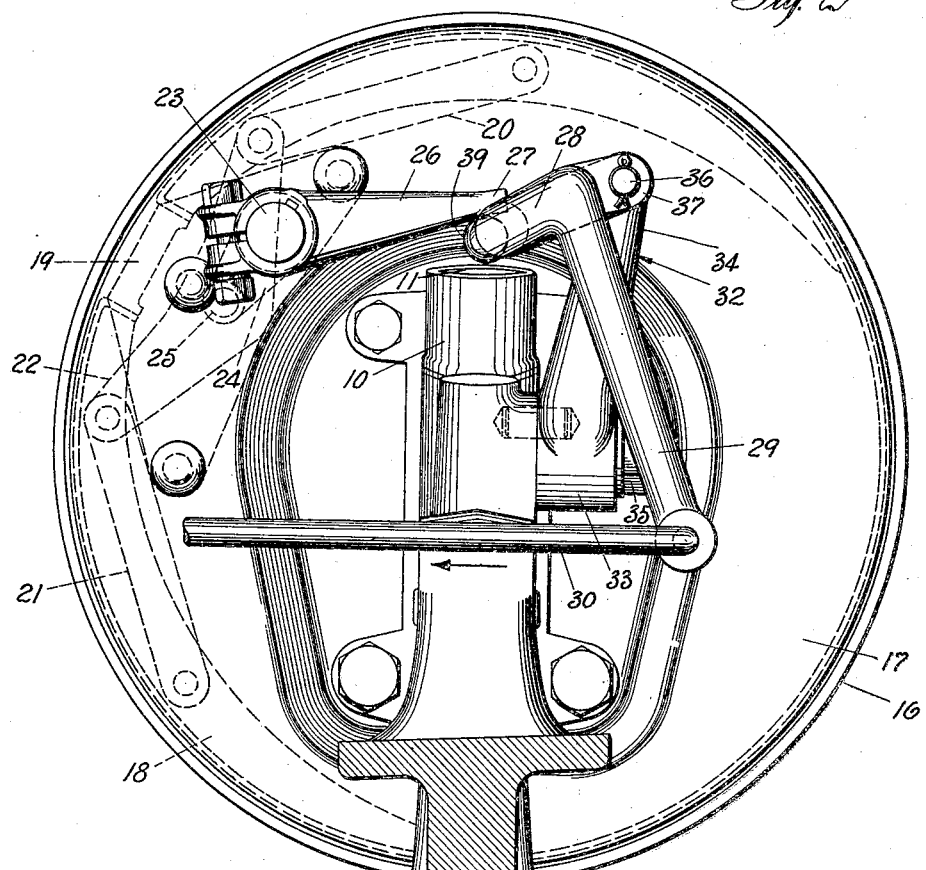
Figure 2 is an end elevation of the brake actuating means looking toward the brake drum dust cover, the vehicle axle being shown in section.
Figure 3:
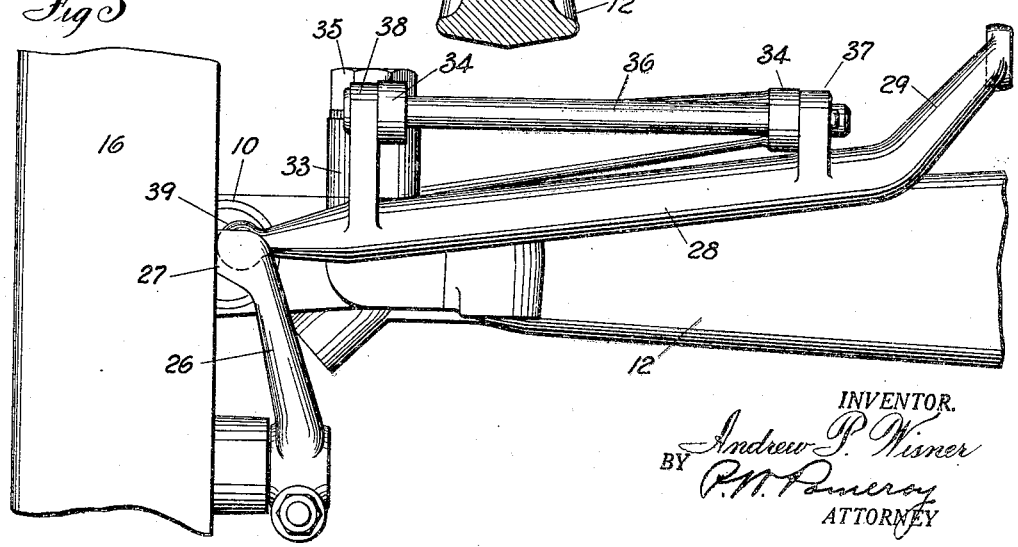
Figure 3 is a plan view of the actuating mechanism looking downwardly toward the axle.

The brake mechanism as shown in Figure 2 comprises a brake element 18 which has its free ends abutting against a stop member 19 secured to the backing plate 17 in any desired manner. The brake element 18 is operated by links 20 and 21 which are interconnected by means of an operating bar 22. A shaft 23 rotatably supported in the backing plate 17 has an arm 24 mounted thereon pivotally attached to the operating bar 22 intermediate its ends by a pin 25. A second arm 26 having a flat face 27 at its free end is secured to the shaft 23 exteriorly of the backing plate 17 in a manner so that the flat face 27 is positioned directly above the steering knuckle king pin 11 as is clearly shown in Figures 1 and 2.

The present invention deals with a new and novel means for actuating the brake applying mechanism through the arm 26. This operating means comprises a bar or operating shaft 28 which has one end thereof disposed at an angle to the main body portion to form a short arm 29 adapted to be connected with a pull rod 30 connected with a brake applying means such as a foot or hand lever (not shown) for applying the brake actuating mechanism.

The axle 12 is provided with a projection 31 adapted to support a bracket 32 having a hub 33 and arms 34 extending therefrom for a purpose to be hereinafter described. The bracket heretofore described it secured to the projection 31 on the axle 12 by means of the bolt 35. The free ends of the arms 34 have openings therein adapted to receive the pivot pin 36, the longitudinal axis of which extends substantially parallel to the longitudinal axis of the axle 12. The operating bar or shaft 28 is provided with a pair of arms 37 and 38 extending substantially perpendicular to the longitudinal axis thereof which have openings therein to receive the pivot pin 36 so that the bar 28 is hingedly supported thereby. The outer end of the bar 28 preferably terminates in a spherically shaped portion 39 which contacts with the flat surface 27 of the arm 26 substantially on the axis of the steering knuckle king pin 11.

Upon movement of the link 30 in the direction of the arrow as shown in Figure 2, it will be seen that the bar 28 which is hingedly supported by the arms 37 and 38 on the pin 36 will be moved bodily on a radius about the pin 36 whereby the ball end 39 on the bar 28 moves in a circular path, and in so doing exerts a pressure against the arm 26 which rotates the shaft 23 supported in the backing plate 17 to operate the arm 24 and the connecting link mechanism comprising the plate 22 and links 20 and 21 to thereby move the brake element 18 into engagement with the brake drum 16. The contact point of the ball end 39 with the flat face 27 of the arm 26 is substantially on the axis of the king pin 11 and as a result the ball 39 will not inadvertently cause any movement of the arm 26 when the wheel 15 is pivoted during the steering of the vehicle.

It will be noted that when the arm 29 is moved in a clockwise direction as viewed in Figure 2 that the bar 28 will be swung bodily about the pin 36 as an axis whereby the ball end 39 will rock the arm 26 and the shaft 23 for actuating the brake applying means in the manner heretofore described. It will also be understood that the bar 28 does not in itself have a rotatable movement but that the same is adapted to swing bodily on its pivot for the purpose heretofore described.

While I have shown a preferred movement of my present invention, it is to be understood, however, that formal changes may be made in the specific embodiment thereof without departing from the spirit and substance of the broad invention the scope of which is commensurate with the appended claims.

What I claim is:

1. In combination with a vehicle brake, actuating means therefor comprising a member hingedly supported intermediate its ends, the axis of said support being offset from the longitudinal axis of said member, and means for swinging said member on said support whereby the free end of said member is rotated in a circular path to actuate said brake.

2. In combination with a vehicle brake, actuating means therefor comprising a bar hingedly supported on a member having its longitudinal axis offset from the longitudinal axis of said bar, and means for swinging said bar on said support whereby the free end of said bar is rotated in a circular path to actuate said brake.

3. In combination with a vehicle brake, actuating means therefor comprising a stationary member, a member hingedly supported thereby having its longitudinal axis at an angle to the longitudinal axis of said stationary member, and means for swinging said hinged member on said support for rotating the free end thereof in a circular path to actuate said brake.

4. In a vehicle, the combination with an axle, a wheel having a brake drum secured thereto rotatably mounted on said axle, braking means engageable with said drum, a backing plate, and brake actuating means mounted on said backing plate, of means for operating said brake actuating means comprising, an operating bar extending substantially parallel with said axle, a support on said axle having its longitudinal axis at an angle to the longitudinal axis of said operating bar hingedly supporting said bar, and means for swinging said bar on said support for moving the free end thereof in a circular path to operate said braking means.

5. In a vehicle, the combination with an axle, a wheel having a drum secured thereto rotatably mounted on said axle, and braking means engageable with said drum, of means for actuating said braking means comprising a bar having arms extending therefrom, a support on said axle, a pivot pin carried on said support received in said arms on said bar, and means for swinging said bar on said pivot pin whereby the free end of said bar is moved in a circular path to actuate said braking means.

6. In a vehicle, the combination with an axle, a wheel having a drum secured thereto rotatably mounted on said axle, and braking means engageable with said drum, of means for actuating said braking means comprising an operating member having an arm formed at an angle thereto, a support on said axle, a pivot pin carried on said support for supporting said operating member on an axis offset from the longitudinal axis of said member, and means connected with said arm for swinging said member in a circular path to actuate said braking means.

7. In a vehicle, the combination with an axle, a wheel having a drum secured thereto rotatably mounted on said axle, and braking means engageable with said drum, of means for operating said braking means comprising an operating bar extending substantially parallel with said axle, said bar having substantially parallel arms extending therefrom, a support on said axle, a pivot pin carried on said support mounted in said arms, and means for moving said operating bar in a circular path on said pivot pin as an axis for actuating the said braking means.

Signed by me at South Bend, Indiana, this 13th day of April, 1929.

ANDREW P. WISNER.